US007418971B1

(12) United States Patent
Ingram

(10) Patent No.: US 7,418,971 B1
(45) Date of Patent: Sep. 2, 2008

(54) VENDING MACHINE HOSE CONTROLLER

(75) Inventor: James Larry Ingram, Pine Bluff, AR (US)

(73) Assignee: **Fragra*matics Manufacturing Co., Inc.**, Pine Bluff, AK (US)

( * ) Notice: Subject to any disclaimer, the term of this patent is extended or adjusted under 35 U.S.C. 154(b) by 633 days.

(21) Appl. No.: 11/155,969

(22) Filed: Jun. 20, 2005

(51) Int. Cl.
*B08B 3/00* (2006.01)
*F16L 55/00* (2006.01)

(52) U.S. Cl. .................... 134/172; 134/56 R; 134/94.1; 134/103.2; 134/117; 134/119; 285/81; 285/89; 285/91

(58) Field of Classification Search ....................... None
See application file for complete search history.

(56) References Cited

U.S. PATENT DOCUMENTS 1,394,740 A 10/1921 Klocke
1,646,805 A 10/1927 Bell
3,291,441 A * 12/1966 Hansen ....................... 251/122
3,367,681 A 2/1968 Braukman
3,413,020 A 11/1968 Johns
3,502,111 A * 3/1970 Hansen ........................ 138/46
3,608,933 A * 9/1971 Lee ............................ 285/39
3,768,115 A 10/1973 Hoffmann
4,131,132 A * 12/1978 Zierden ...................... 137/615
4,141,574 A * 2/1979 Stansifer et al. ............... 285/92
4,349,952 A * 9/1982 Decker et al. ............ 29/402.06
4,798,333 A * 1/1989 Luchsinger ................. 239/142
4,927,188 A * 5/1990 Sands .......................... 285/89
5,016,920 A * 5/1991 Anderson .................... 285/39
5,074,438 A * 12/1991 Ingram ....................... 222/132
5,180,265 A 1/1993 Wiese
5,215,112 A 6/1993 Davison
5,286,068 A 2/1994 Wiebe
5,871,239 A 2/1999 Boscaljon
6,604,758 B1 8/2003 Assenheimer
6,808,056 B2 10/2004 Neu et al.
7,303,199 B2 * 12/2007 Chen ..................... 280/87.041

* cited by examiner

*Primary Examiner*—Michael Barr
*Assistant Examiner*—Rita R Patel
(74) *Attorney, Agent, or Firm*—Stephen D. Carver

(57) ABSTRACT

A vending machine and a hose controller system for vending machines wherein the dispenser hose is axially and torsionally controlled to facilitate slight twisting, thereby minimizing applicator tool resistance, and making it easier for users to operate the remote vending tool on the hose distal end. The elongated reinforced applicator hose terminates at the controller, which bridges the hose between the outdoors and the cabinet interior. The controller has an angulated bracket mounted within the vending machine cabinet. A collar assembly secured on the bracket top above a hose feed-through orifice has a terminator, a bushing, and a cooperating yoke that are coaxially secured. The terminator anchors the hose end and is seated within the yoke. A rigid lug projects radially from the yoke. A rigid restrictor surmounts the collar assembly and limits rotation by contact with the lug.

21 Claims, 8 Drawing Sheets

VENDING MACHINE HOSE CONTROLLER

BACKGROUND OF THE INVENTION

1. Field of the Invention

The present invention relates generally to vending machines that operate through external product applicator hoses. More particularly, the present invention relates to so-called coin-operated vending machines of the type commonly employed at self-service car washes that vend selected products to customer vehicles through elongated hoses.

2. Description of the Related Art

Self service, coin-operated car washes customarily include numerous service bays that customers enter to spray-wash their vehicles. Elongated hoses or "wands" terminating in various applicator heads or spray nozzles typically direct a power stream of fluid towards the vehicle being serviced. (The term "coin-operated" refers to self service vending machines that accept coins, credit cards, currency, tokens, or combinations thereof.) As the self-service car wash industry has evolved, products or services other than washing or waxing have become available, and consumer-demand for ancillary car-wash products continues to grow. Thus, modern car washes offer numerous options for detailing cars. As part of a thorough cleaning, the vehicle carpet should be vacuumed. Some vacuum cleaning systems include optional carpet cleaners or spot removers that are applied prior to vacuuming to dislodge stubborn stains. Shampoo applicators are quite common. Spray-applied fragrances are also popular, and various coin-operated, fragrance dispensing machines exist for treating vehicle interiors. Thus most modern car wash installations include one or more coin-operated vacuuming machines, carpet cleaning machines, fragrance applicators and the like. While typical spray-wash and spray-wax services are offered within one of numerous service bays provided by the installation, vending machines for ancillary car wash products are usually mounted outdoors on a special, illuminated service island, proximate a convenient parking space for the customer.

Elongated, reinforced applicator hoses are common in the car wash industry. As mentioned, hand-held spray wands or gun-applicators are typically used in the washing bays. Elongated applicator hoses leading to suitable hand-held suction heads are used by vacuuming machines. Fragrance dispensers typically employ elongated tubular applicator hoses as well. Because vending machines are often subject to theft and vandalism, applicator hoses must be rugged and durable. Typical reinforced hoses include a rugged, metallic tubular core surrounded by an outer, impact resistant plastic cover. Washing hoses are designed for high pressure, high volume use. With vacuuming machines, internal conduits running through the applicator hose interconnect the suction head with the power vacuum motors disposed within the machine cabinet. Spot remover pumps route fluid through separate conduits protected within the applicator hose. Fragrance machines may route one or more low-diameter fragrance lines interiorly through the reinforced applicator hose along with separate electrical control lines running to applicator control switches.

For example, my prior U.S. Pat. No. 4,527,713 issued Jul. 9, 1985 discloses a coin-operated, cabinet-mounted fragrance dispenser for spraying desired fragrances interiorly of vehicles proximate a car wash. An elongated, reinforced applicator hose houses other smaller diameter conduits that route fragrance solutions.

My prior U.S. Pat. No. 5,074,438 entitled "Full Service Car Wash Fragrance Dispensing Machine" discloses a vending machine using a hand-operated applicator gun interconnected with an elongated applicator hose. The machine outputs a dose of fragrance mist during each application. The elongated hose interconnecting the applicator gun and the vending machine coaxially surrounds separate conductive tubes that individually transmit air and fragrance concentrates to an atomizer manifold disposed within the applicator gun.

My prior U.S. Pat. No. 4,968,166 entitled "Carpet Cleaning Machine With Foaming Control Block With Heater And Brush" discloses a coin operated carpet and upholstery vending machine that vigorously cleans automotive interiors. An elongated hose extending from the unit enclosure terminates in hand-held brush which outputs foam. In use the hand-held is forcibly rubbed against the carpet during cleaning.

Finally, my prior design patent, U.S. Pat. No. 381,477, discloses a vacuum cleaner that offers both fragrances and shampoo. Again, an elongated applicator hose is included In almost all cases the "business end" of the applicator hose includes a suitable, hand-held tool. With sprayers, this may be an ergonomically designed gun that is easy to hold and manipulate. With simpler spray designs, a mere wand is employed. With the carpet cleaning machine mentioned above, a manually operated, foaming carpet brush is employed. In any case, as the user of the applicator tool moves it about during normal use, the applicator hose will inevitably be twisted a predetermined amount. In other words, user wrist and arm movements will tend to twist the applicator tool, and such twisting movements are mechanically transmitted directly to the applicator hose. Since modern vandal-resistant, applicator hoses are extremely rugged and durable, the twisting moments applied at their terminal end will be transmitted to the opposite end that is routed into the vending machine. It is imperative that the vending machine connection be secure; the connection must resist axial and torsional forces. Since numerous wires and conduits or smaller hoses may be routed through the applicator hose, and since they are interconnected interiorly of the vending machine to critical parts, they must not be rotated too much.

Thus, the hose connection point must limit axial and torsional stress. However, if torsional deflections are prevented completely by an overly rigid connection, movements of the applicator tool at the opposite hose end will be resisted. Where hose rotation is not allowed, the remote applicator tools will be difficult to maneuver. Resistive forces from the cabinet-hose junction that are transmitted back to the hand tool will interfere with customer freedom of movement.

SUMMARY OF THE INVENTION

The hose controller system described herein enables the dispenser hose on typical coin-operated vending machines to twist slightly. In other words, slight torsional deflections of the vending hose are permitted with the mounting arrangement I have perfected. When customers manipulate an applicator appliance at the hose output end, which occurs, for example, when cleaning an automotive carpet with a foaming brush, or when a wand or applicator gun is twisted or turned, torsional hose motion is mechanically transmitted back to the vending machine. Although the hose must be axially secured, slight torsional rotations are possible with my arrangement, so ease of use is maximized. In other words, the hose will not resist slight rotational moments, and customer discomfort is avoided, because the applicator tool will offer less resistance. Consequently, ease of use is maintained.

A typical vending machine with the system has a rigid, upright, cabinet standing upon an elevated, outdoor pedestal or service island. Various types of products known to the art are vended through an elongated, steel-braided hose, that is quite stiff. The hose terminates remotely in an applicator tool, such as a spray head, a wand, an applicator gun or the like. The opposite end of the hose terminates at my new controller, which admits the hose into the cabinet so that conduits within the hose can be connected to various parts, such as blowers, vacuum motors, pumps, fragrance valves, fluid reservoirs, electrical terminals and the like. The controller forms a bridge for the hose between the outdoors and the cabinet interior.

The controller is preferably mounted within the cabinet interior of the vending machine proximate a hose entry orifice. A rigid shroud mounted outside the cabinet provides a covering shield. An angulated mounting bracket secures a rotatable collar assembly beneath a rigid restrictor plate. The collar assembly restrains axial hose movement, but permits rotation.

The collar assembly is secured on the bracket top above a hose feed-through orifice. The collar assembly comprises a terminator, a bushing, and a cooperating yoke that are coaxially secured together. The terminator preferably comprises a hex nut whose threaded interior receives and anchors the hose end. One or more of the peripheral terminator facets are tapped for suitable retainer screws that are tightened in assembly to secure the hose. The terminator penetrates the bushing and is seated within an orifice in the yoke. A rigid lug projects outwardly from the yoke periphery. A rigid restrictor that surmounts the collar assembly and limits rotation by interacting with the lug. Downwardly projecting restrictor sides include spaced apart notches. Collar assembly rotation is limited when the yoke lug rotates into the restrictor notches and physically abuts the restrictor sides.

Thus, a basic object of the invention is to provide a reliable applicator hose mounting system for vending machines, that both axially and rotationally limits hose motion.

More specifically, it is an object to safely and dependably mount a vending machine hose in such a manner that it may be twisted slightly by customers, without destroying or severing the wires, conduits, or other filamentary elements passing through it.

Another object is to provide a feed-through system that safely and non-destructively mounts a vending machine applicator hose.

A related object is to provide an improved vending machine characterized by a secure applicator hose mounting system of the character described.

It is also an object to provide a hose mounting system for vending machines that can be used for a variety of automotive car-wash products, including spray wash, wax applicators, vacuum, fragrances, cleaning solutions, spot cleaners, and the like.

Another basic object is to provide a vending machine hose arrangement that twists a predetermined amount without breakage or unnecessary wear.

Another object is to provide a vending machine hose system that is reinforced and durable.

These and other objects and advantages of the present invention, along with features of novelty appurtenant thereto, will appear or become apparent in the course of the following descriptive sections.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
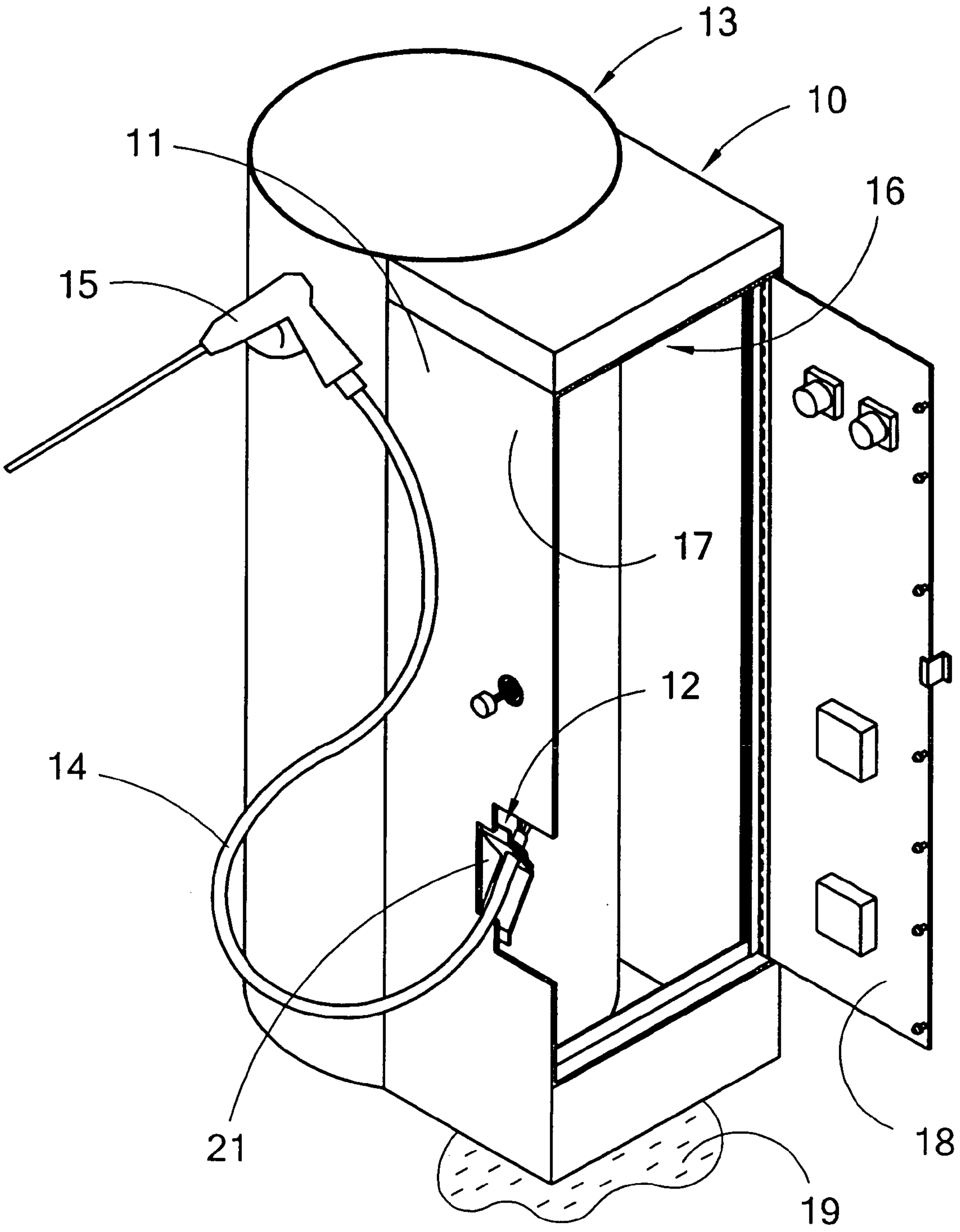
FIG. 1 is a fragmentary, left isometric view of a vending machine equipped with my new hose controller.
Figure 2:
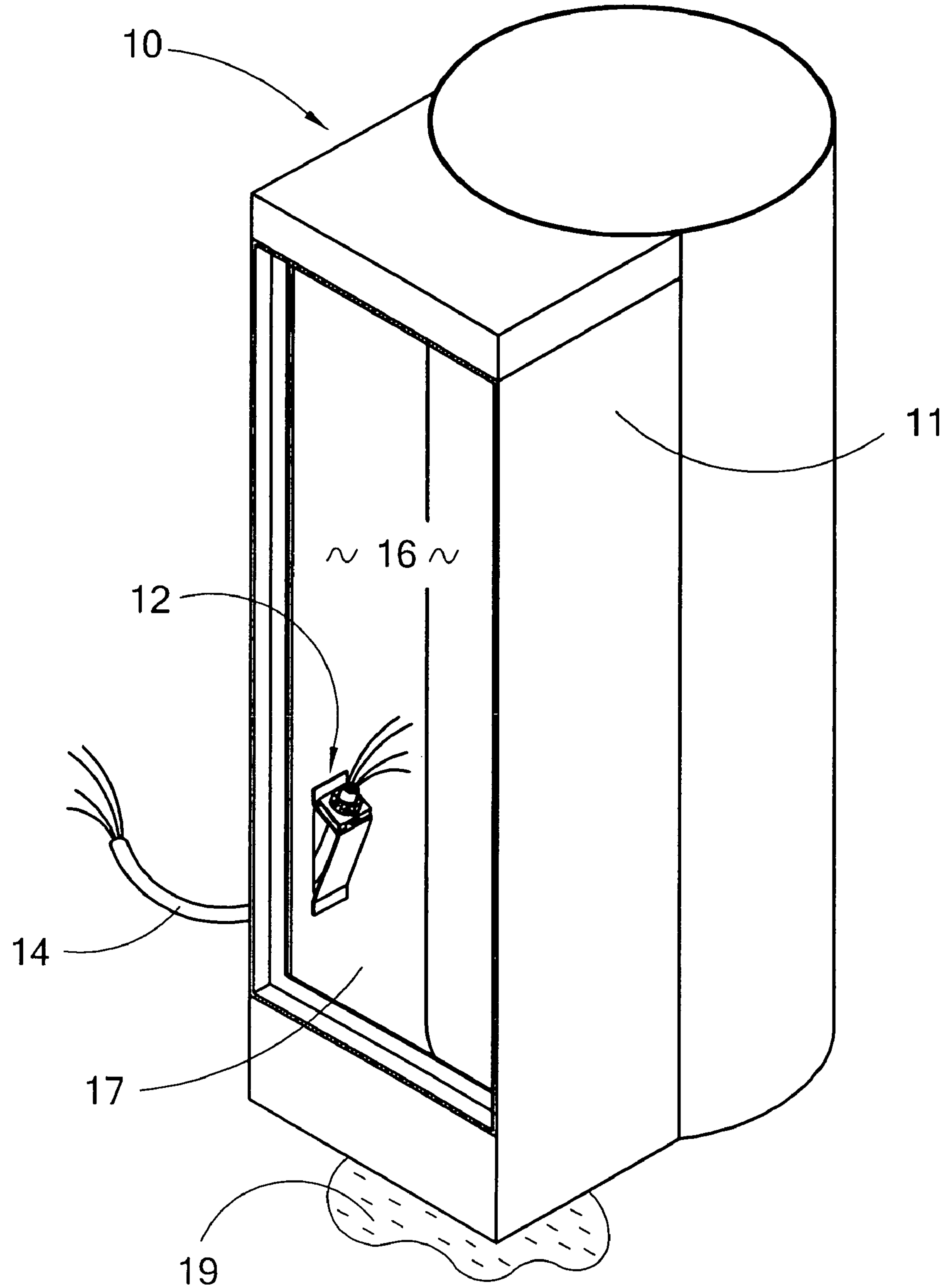
FIG. 2 is a fragmentary, right side isometric view of the vending machine of FIG. 1, with parts omitted for clarity.

With initial reference directed to FIGS. 1 and 2 of the appended drawings, a vending machine generally designated by the reference numeral 10 includes a hose controller 12. It will be appreciated that vending machine 10 may include a variety of different internal parts, shelves, dispenser arrangements, coin-acceptors, dollar-bill acceptors or other typical accessories and features that are known to those skilled in the vending arts. Importantly, vending machine 10 is designed to vend fluids, such as fragrance, vacuum, etc. via an elongated, flexible, hose 14 that externally extends from the vending machine and terminates in a suitable applicator tool 15. An example of a car-wash vending machine applicator tool for dispensing fragrances is provided by my prior U.S. Pat. No. 4,527,713. My prior U.S. Pat. No. 5,074,438 discloses a typical hand-operated fragrance applicator gun interconnected with a vending machine by an elongated applicator hose such as hose 14. My prior U.S. Pat. No. 4,968,166 shows an applicator tool comprising a foaming brush connected to the external hose which is rubbed against the carpet during cleaning. The foregoing patents are hereby incorporated by reference for purposes of disclosure.

Vending machine 10 comprises a rigid, upright, cabinet 11 preferably made of stainless steel. Cabinet is normally disposed upon a suitable supporting surface 19 (FIG. 1), preferably provided by an elevated, outdoor pedestal or mounting island of conventional design. Plumbing and electrical connections necessary for vending machines of this genre will be available proximate the mounting island, and often they are wired through the island into the interior volume 16 of the vending machine, as recognized by those skilled in the art. Cabinet 11 may be sized and shaped as desired. The illustrated cabinet 11 comprises a separate, frontal section shaped generally like a parallelepiped that has sides 17. In the illustrated design, there is a cylindrical rear cabinet section 13 that is optional. Alternatively, cabinet 11 may be in the form of a parallelepiped. A large, generally rectangular front door 18 is mounted to the front section and can be opened to expose cabinet interior 16. When door 18 is closed, the cabinet interior 16 will be sealed and protected from the outside environment. As will be recognized by those skilled in the art, a variety of conventional vending machine equipment and components (i.e., such as power supplies, vacuum motors, filters, pumps, timers, circuit boards, fuses, wiring etc.) will be protectively housed within interior volume 16. Various quantities of products to be vended, such as liquid fragrance concentrate, will be stored within interior volume 16 as well.

The structure of the door 18 and the cabinet 11 are not vital to an understanding of the invention, and it will be appreciated that numerous cabinet arrangements are possible. However, the invention is employed in conjunction with vending machine designs that deliver product via an external hose 14 that intercommunicates with a cabinet interior 16. The reinforced, steel-braided hose 14 is flexible to a certain extent, but it is rigid enough such that mechanical motions imparted to the applicator tool 15 will be transmitted back to the cabinet. If the hose 14 is rigidly terminated at the cabinet so it cannot rotate, it will make it harder to use the tool 15, and customers are inconvenienced. Controller 12 facilitates limited hose rotation so limited wrist actions of customers on the applicator tool 15 are allowed, and the applicator tool 15 is easier to use.

Figure 3:
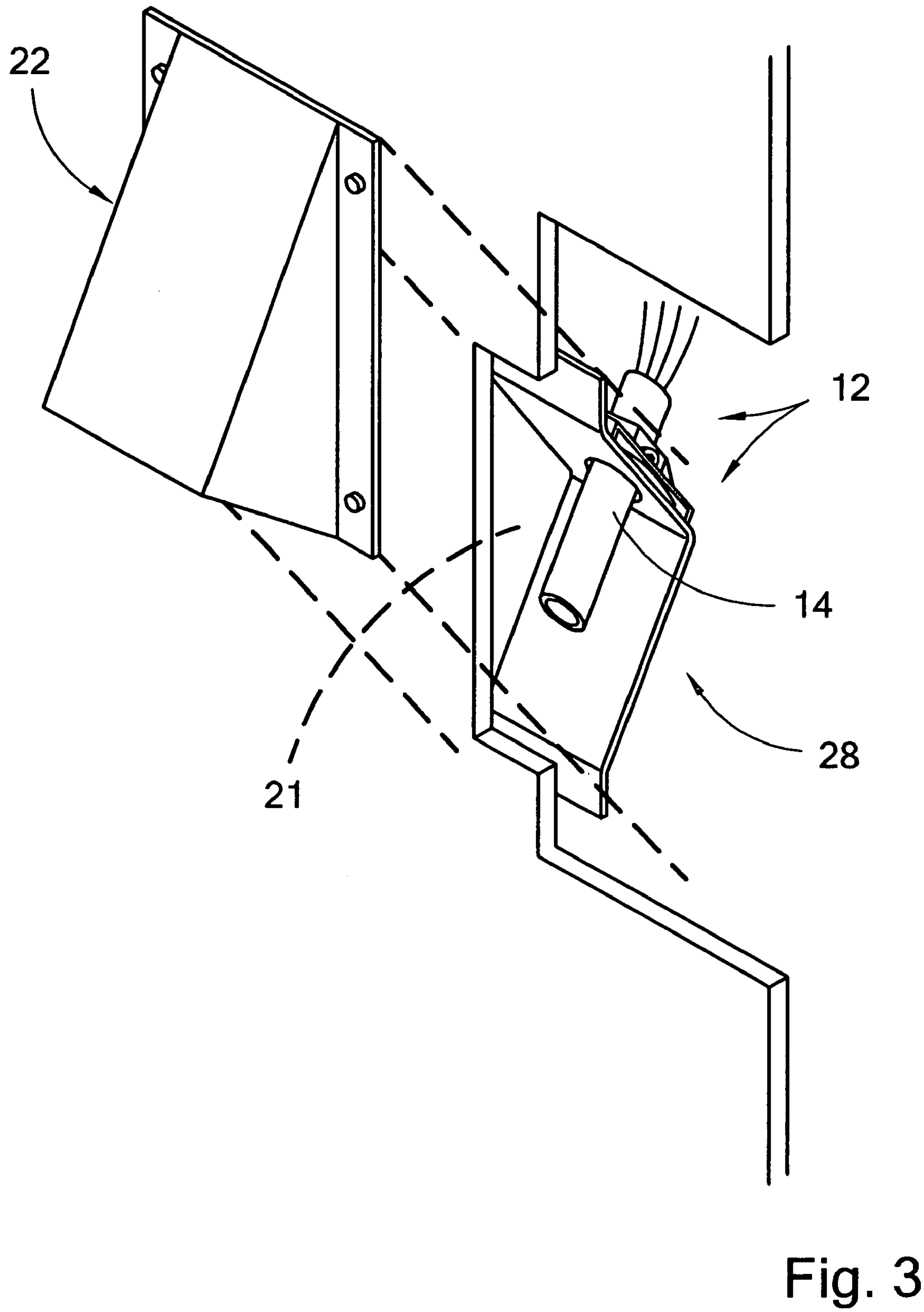
FIG. 3 is an enlarged, partially-exploded, fragmentary isometric view of the hose controller.
Figure 4:
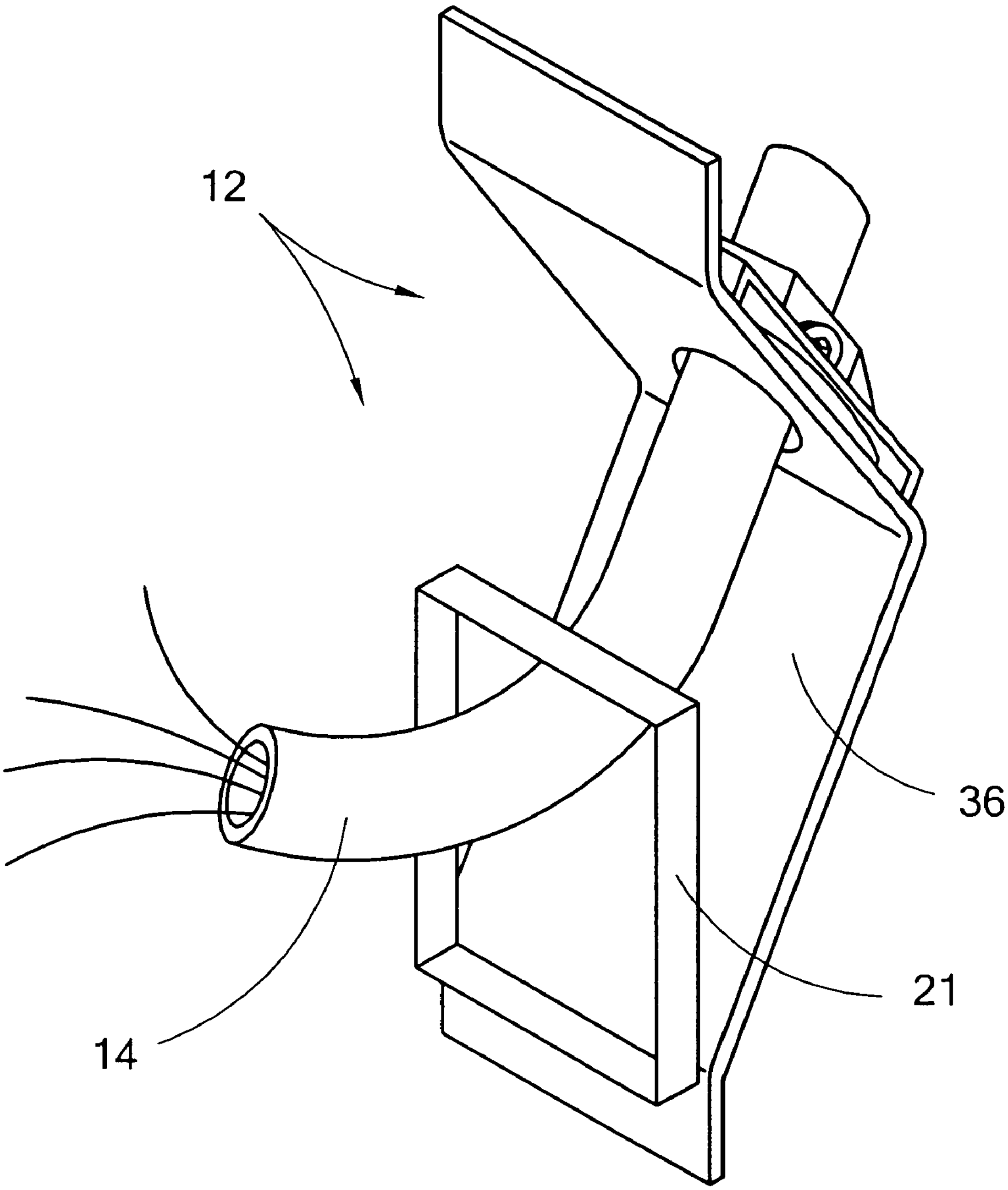
FIG. 4 is a further enlarged, fragmentary left isometric view of the hose controller.

With additional reference now directed to FIGS. 3-9, hose 14 is elongated and hollow. Hose controller 12 securely mechanically mounts hose 14 to the cabinet, and forms a juncture or bridge for the hose between the cabinet interior and the exterior. Preferably, controller 12 is mounted within cabinet interior 16 on a side 17 adjacent a hose entry orifice 21 (FIG. 1). FIG. 3 shows the controller 12 as it appears looking through orifice 21. Normally a rigid shroud 22 (FIG. 3), which is mounted externally on the cabinet side 17, protectively covers the controller and the end of the hose 14. Preferably the hose 14 approaches the controller 12 at an angle, and is mechanically secured thereto. Controller 12 has parts to be described hereinafter that securely grasp the hose 14 and mechanically terminate it. Various smaller diameter conduits 25-27 run through hose 14. These conduits comprise a variety of hoses, lines, and electrical wires that run from various parts inside the cabinet interior 16 to the remote applicator tool 15. In the case of a fragrance machine, there will be at least two electrical control wires and at least one fragrance line. Vacuuming machines may route vacuum through hose 14, along with ancillary wiring. Cleaning solutions, spot remover, and other needed fluids may be routed through hose 14 as needed depending upon the vending machine design. Inside cabinet 11 the various conduits 25-27 will be connected to various constituent parts. It will be apparent that if hose 14 were allowed to twist uncontrollably, these critical conduits 25-27 could be severely damaged.

With primarily reference now directed to FIGS. 5-9, controller 12 comprises a rigid, preferably stainless steel mounting bracket 28 that mounts a collar assembly 30 beneath a restrictor 32. The collar assembly 30 receives the end of hose 14 and restrains axial movements, while allowing limited hose rotation. The limits of possible torsional hose displacements or rotation are established by the design of restrictor 32.

Figure 5:
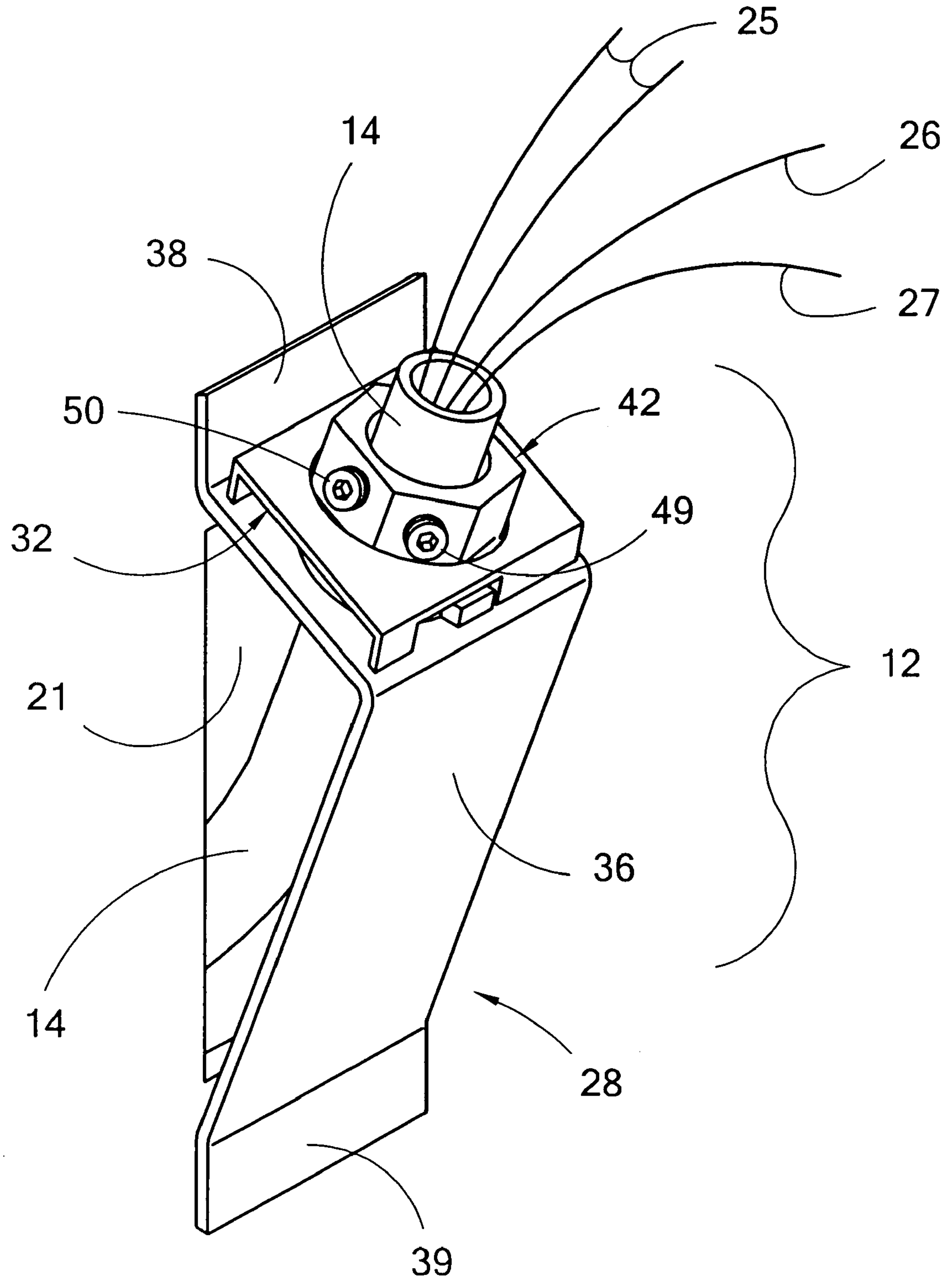
FIG. 5 is an enlarged, fragmentary right isometric view of the hose controller.
Figure 6:
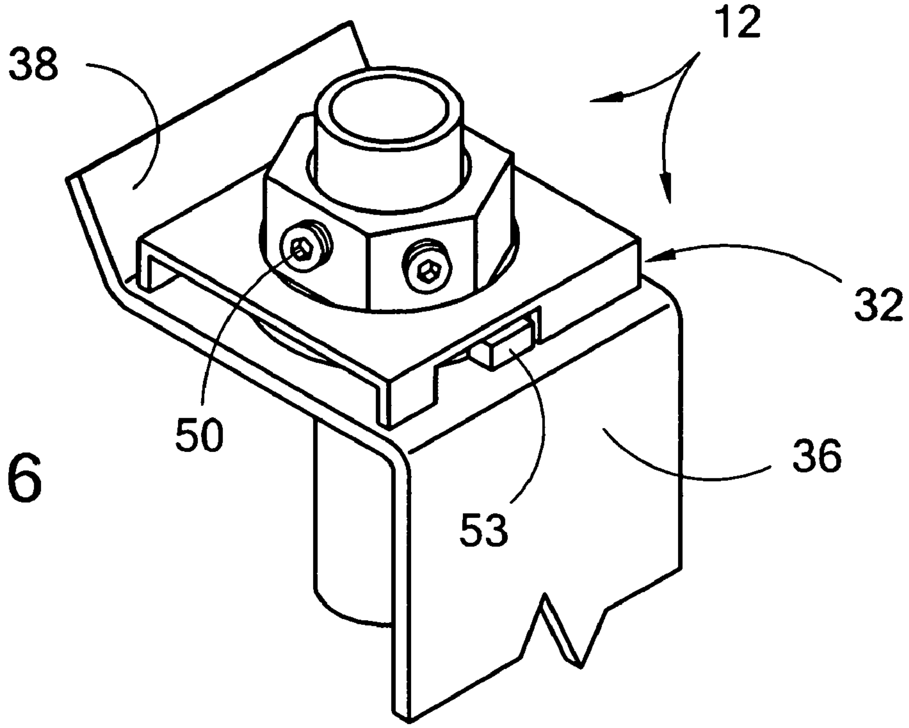
FIG. 6 is an enlarged isometric view of the rotatable controller collar.

The rigid, angulated bracket 28 is mounted within cabinet interior 16 adjacent entry orifice 21 (i.e., FIG. 5). A generally rectangular bracket top 34 angularly deflects away from the larger, main body portion 36. A pair of integral, spaced apart feet 38, 39 that are integral with top 34 and body portion 36 are angled to flushly mount against the interior of cabinet side 17. Preferably the bracket is secured to the cabinet by welding the feet 38, 39. A hose feed-through orifice 40 is defined in bracket top 34.

The collar assembly 30 is rotatably secured atop bracket top 34, being centered above a hose feed-through orifice 40. The collar assembly comprises a terminator 42, a bushing 43, and a yoke 44 that are coaxially welded together. Terminator 42 preferably comprises a hex nut having a threaded interior 46 and a plurality of peripheral facets 48. During assembly, the end of hose 14 is forcibly inserted within the terminator interior 46 and twisted until it fits properly. Some of the terminator facets 48 (FIG. 9) include threaded holes 49 for receiving retainer screws 50 that are tightened against the hose 14 to restrain it. In assembly, hex terminator 42 is seated within a hex orifice 51 (FIG. 9) in yoke 44, passing through a similar hex orifice 52 in bushing 43. The collar assembly can rotate relative to bracket 28, but rotation is limited by a lug 53 projecting from yoke 44 that mechanically contacts restrictor 32 to limit rotation.

Figure 7:
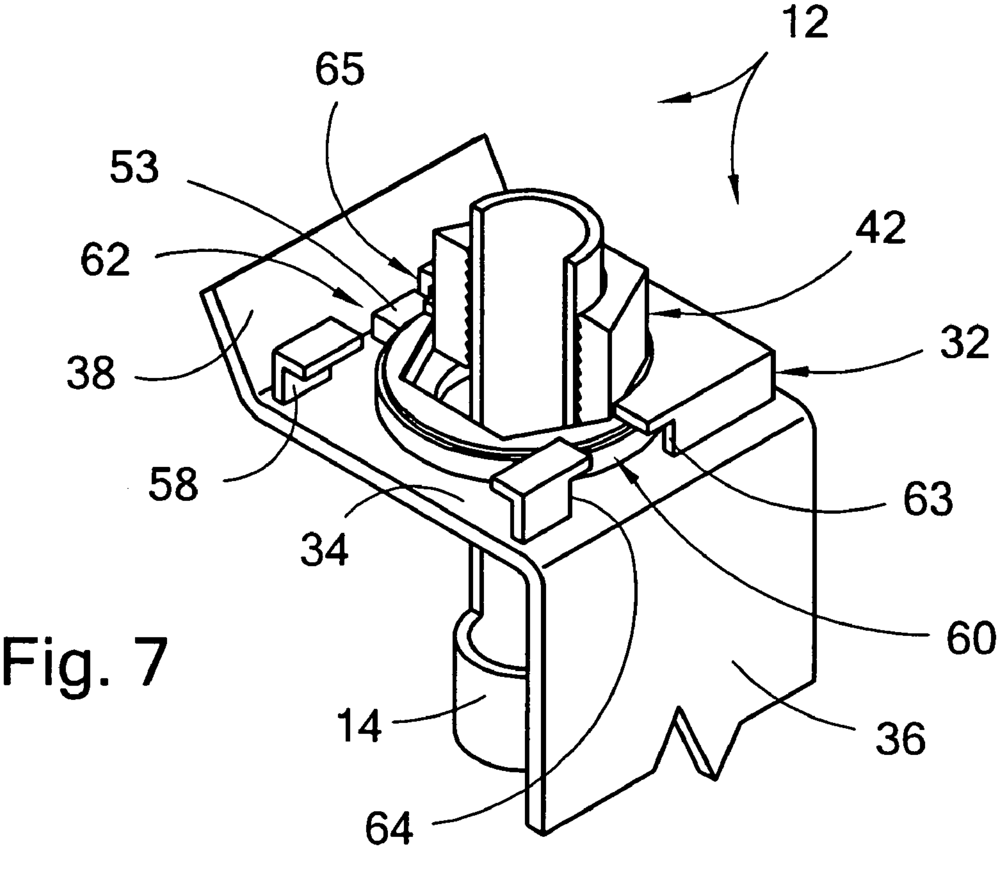
FIG. 7 is an enlarged, fragmentary sectional view of the rotatable controller collar.
Figure 8:
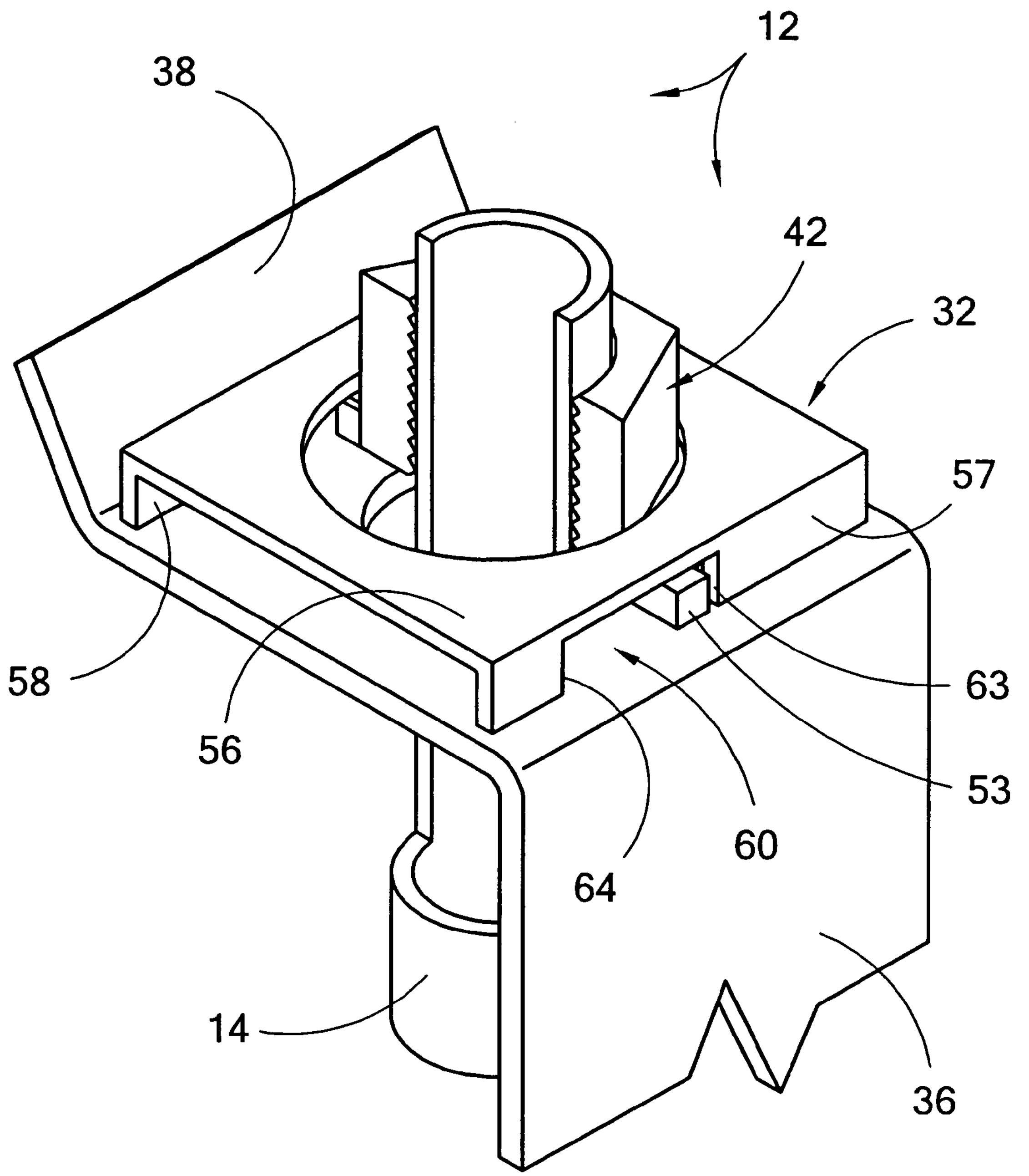
FIG. 8 is an enlarged, fragmentary sectional view of the collar rotated 180 degrees from the position illustrated in FIG. 7; and, FIG. 9 is an exploded isometric assembly view of the hose controller.
Figure 9:
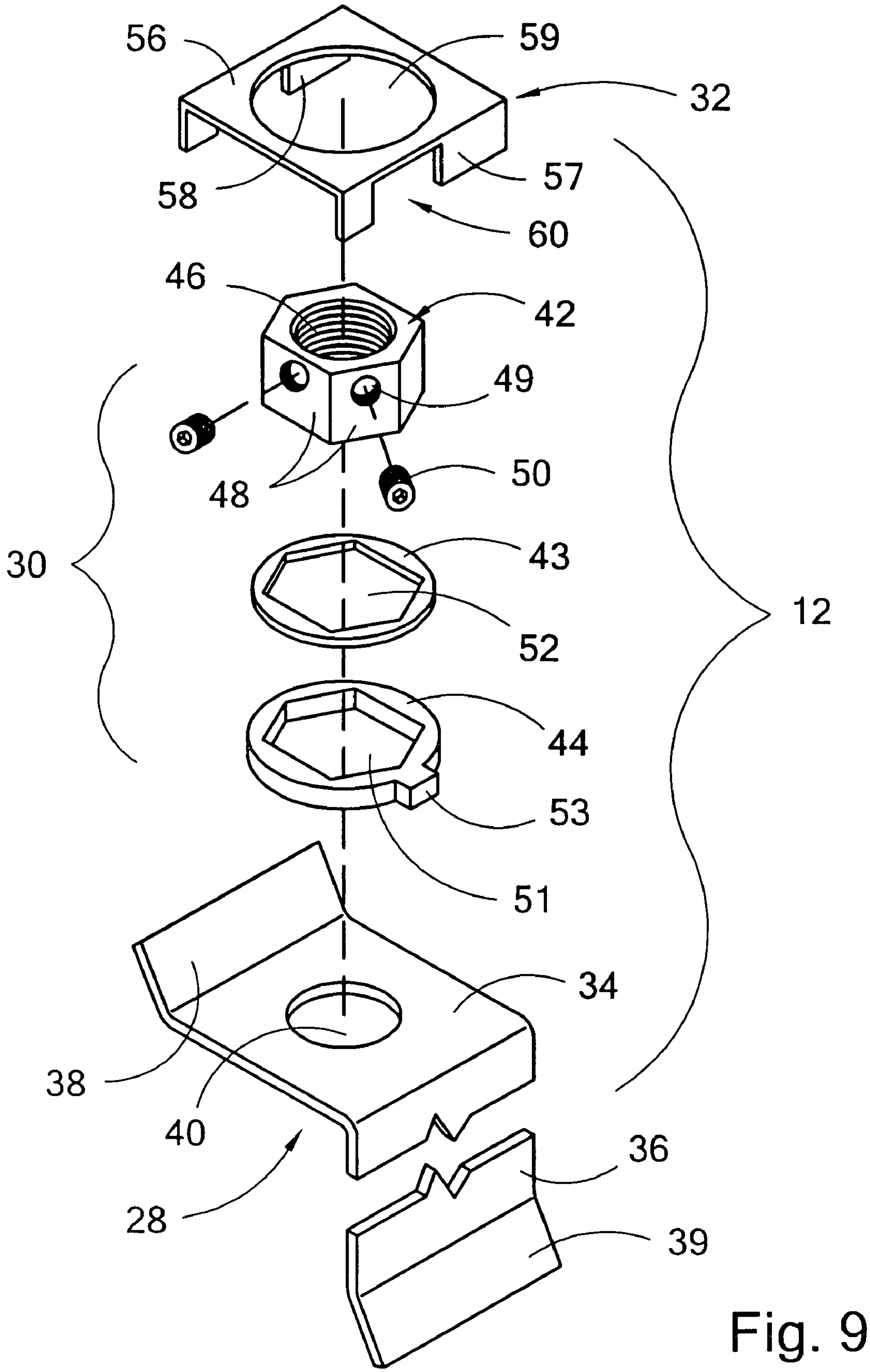

Restrictor 32 covers and centers the collar assembly 30 atop mounting bracket 28. The square restrictor top 56 is integral with a pair of spaced apart, downwardly depending sides 57, 58 that are spot welded to bracket top 34. As best seen in FIGS. 8 and 9, restrictor side 57 has a notch 60. A similar notch 62 (FIG. 7) is defined in opposite restrictor wall 58. The collar assembly 30 is generally coaxial with respect to the circular orifice 59 defined in restrictor top 56. Terminator 42 projects upwardly through restrictor orifice 59. Bushing 43 contacts the underside of restrictor top 56.

As noted, the collar assembly 30 axially restrains and terminates hose 14, but limited collar rotation is enabled by the design. The hose enters the assembly at an angle approximating the angle of the bracket main body portion relative to the side of the cabinet. As the collar assembly rotates, lug 53 on yoke 44 rotates as well, describing a semi-circular arc beneath restrictor 32. As seen in FIG. 8, the collar assembly is maximally deflected counter clockwise (i.e., as viewed looking down on the restrictor 32), and in this position the lug 53 enters notch 60 and collides with the restrictor wall 57. Viewing FIG. 8, it is apparent that lug 53 radially moves into notch 60 and eventually collides with the inner notch end 63. During clockwise motion lug 53 misses outer notch end 64, because end 64 is further away from the center of rotation. Clockwise rotation is possible until lug 53 enters notch 62 in wall 58 (FIG. 7) where it eventually collides with the inner notch end 65. Thus collisions between the collar assembly lug 53 on yoke 44 and the notched walls of the restrictor limit rotation. Hose 14, which is axially captivated by the collar assembly terminator 42, is thus allowed to rotate between limits established by the restrictor notches 60, 62. The limits of rotation are illustrated in FIGS. 7 and 8.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A hose controller for vending machines that have elongated product delivery hoses terminates in remote applicator tools, the controller comprising:

a mounting bracket adapted to be secured to the vending machine adjacent a hose entry orifice;

a collar assembly rotatably mounted atop said bracket to which the hose is fastened, the collar assembly comprising an outwardly projecting lug that rotates with the collar assembly and a restrictor atop the bracket centering said collar assembly, the restrictor comprising at least one side that is physically contacted by said lug to limit collar assembly rotation.

2. The hose controller as defined in claim 1 further comprising a rigid shroud adapted to be mounted externally of the cabinet over said hose entry orifice for covering said controller.

3. The hose controller as defined in claim 1 wherein the bracket is angulated and said hose enters the cabinet at an angle approximating the angle of said bracket.

4. The hose controller as defined in claim 1 wherein the bracket comprises a rigid top comprising a hose feed-through orifice, a rigid, integral body portion angularly extending away from the top, and a pair of integral, spaced apart feet that flushly mount against the interior of the cabinet.

5. The hose controller as defined in claim 1 wherein the collar assembly is rotatably secured atop said bracket top above a hose feed-through orifice.

6. The hose controller as defined in claim 5 wherein the terminator comprises a nut having a threaded interior.

7. The hose controller as defined in claim 6 wherein an end of the hose is rotatably received within the terminator threaded interior.

8. The hose controller as defined in claim 7 wherein the nut comprises at least one peripheral threaded hole for receiving a retainer screw that tightens against the hose to restrain it.

9. The hose controller as defined in claim 7 wherein the restrictor comprises a top integral with a pair of spaced apart, downwardly depending sides, at least on side comprising a notch that the lug enters prior to physically contacting the restrictor to limit hose rotation.

10. The hose controller as defined in claim 5 wherein the collar assembly comprises:

a terminator that has an interior for receiving a hose end;

a yoke that seats the terminator;

wherein said lug projects from said yoke; and, said restrictor has at least one side that is physically contacted by said lug upon predetermined rotation of said collar assembly.

11. A vending machine comprising:

an upright cabinet adapted to be disposed on a supporting surface, the vending machine having an interior and a hose admission orifice;

an elongated product delivery hose terminating in a remote product applicator tool;

a hose controller for restraining the hose and bridging it to the cabinet interior, the controller comprising:

a mounting bracket adapted to be secured to the vending machine adjacent said hose entry orifice;

a collar assembly rotatably mounted atop said bracket for anchoring the hose, the collar assembly comprising an outwardly projecting lug that rotates and a restrictor atop the bracket centering said collar assembly, the restrictor comprising at least one side that is physically contacted by said lug to limit collar assembly rotation.

12. The vending machine as defined in claim 11 wherein the hose controller comprises a rigid shroud adapted to be mounted externally of the cabinet over said hose entry orifice for covering said controller.

13. The vending machine as defined in claim 11 wherein the bracket is angulated and said hose enters the cabinet at an angle approximating the angle of said bracket.

14. The vending machine as defined in claim 11 wherein the bracket comprises a rigid top comprising a hose feed-through orifice, a rigid, integral body portion angularly extending away from the top, and a pair of integral, spaced apart feet that flushly mount against the interior of the cabinet.

15. The vending machine as defined in claim 11 wherein the collar assembly is rotatably secured atop said bracket top above a hose feed-through orifice.

16. The vending machine as defined in claim 15 wherein the collar assembly comprises:

a terminator that has an interior for receiving a hose end;

a yoke that seats the terminator;

wherein said lug projects from said yoke; and, said restrictor has at least one side that is physically contacted by said lug upon predetermined rotation of said collar assembly.

17. The vending machine as defined in claim 16 wherein the terminator comprises a nut having a threaded interior.

18. The vending machine as defined in claim 17 wherein an end of the hose is rotatably received within the terminator threaded interior.

19. The vending machine as defined in claim 18 wherein the nut comprises at least one peripheral threaded hole for receiving a retainer screw that tightens against the hose to restrain it.

20. The vending machine as defined in claim 18 wherein the restrictor comprises a top integral with a pair of spaced apart, downwardly depending sides, at least on side comprising a notch that the lug enters prior to physically contacting the restrictor to limit hose rotation.

21. The vending machine as defined in claim 20 wherein:

the bracket is angulated and said hose enters the cabinet at an angle approximating the angle of said bracket; and, the bracket comprises a rigid top comprising a hose feed-through orifice, a rigid, integral body portion angularly extending away from the top, and a pair of integral, spaced apart feet that flushly mount against the interior of the cabinet.

* * * * *